United States Patent
Yun et al.

(10) Patent No.: US 9,994,769 B2
(45) Date of Patent: *Jun. 12, 2018

(54) LIQUID CRYSTAL COMPOSITION

(71) Applicant: ShiJiazhuang Chengzhi Yonghua Display Material Co, Ltd, Shijiazhuang, Hebei province (CN)

(72) Inventors: GuoLiang Yun, Shijiazhuang (CN); Kui Wang, Shijiazhuang (CN); Yun Xia Qiao, Shijiazhuang (CN); Wei Wang, Shijiazhuang (CN); Yan Li Dong, Shijiazhuang (CN)

(73) Assignee: SHIJIAZHUANG CHENGZHI YONGHUA DISPLAY MATERIAL CO, LTD., Shijiazhuang, Hebei Province (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/165,753

(22) Filed: May 26, 2016

(65) Prior Publication Data
US 2017/0015906 A1    Jan. 19, 2017

(30) Foreign Application Priority Data
Jul. 13, 2015 (CN) .......................... 2015 1 0408283

(51) Int. Cl.
| | |
|---|---|
| *C09K 19/30* | (2006.01) |
| *C09K 19/34* | (2006.01) |
| *C09K 19/02* | (2006.01) |
| *C09K 19/20* | (2006.01) |
| *C09K 19/58* | (2006.01) |
| *C09K 19/04* | (2006.01) |

(52) U.S. Cl.
CPC ...... *C09K 19/3402* (2013.01); *C09K 19/0208* (2013.01); *C09K 19/20* (2013.01); *C09K 19/30* (2013.01); *C09K 19/3003* (2013.01); *C09K 19/3066* (2013.01); *C09K 19/3098* (2013.01); *C09K 19/586* (2013.01); *C09K 19/588* (2013.01); *C09K 2019/0466* (2013.01); *C09K 2019/301* (2013.01); *C09K 2019/3004* (2013.01); *C09K 2019/3016* (2013.01); *C09K 2019/3019* (2013.01); *C09K 2019/3021* (2013.01); *C09K 2019/3025* (2013.01); *C09K 2019/3422* (2013.01)

(58) Field of Classification Search
CPC ....................................................... C09K 19/30
See application file for complete search history.

(56) References Cited

U.S. PATENT DOCUMENTS

2017/0101581 A1* 4/2017 Yuan .................. C09K 19/3066

\* cited by examiner

*Primary Examiner* — Chanceity Robinson
(74) *Attorney, Agent, or Firm* — Muncy, Geissler, Olds & Lowe, P.C.

(57) ABSTRACT

A liquid crystal composition having one or more compounds shown as formula I and one or more compounds shown as formula II, and the liquid crystal composition comprising a compound shown as formula II-A:

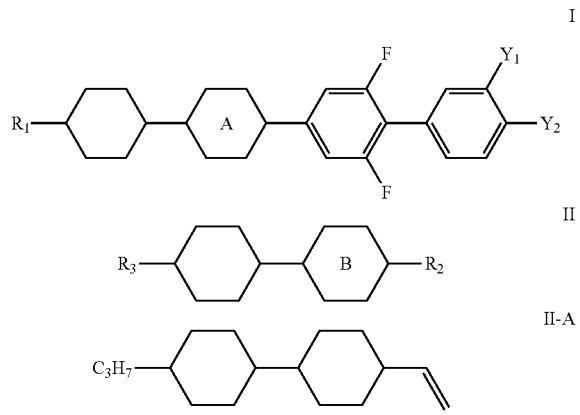

wherein substituents are all defined. The composition has a low viscosity $\gamma_1$, a moderate dielectric anisotropy $\Delta\varepsilon$ and a moderate optical anisotropy $\Delta n$, and can achieve fast response of a liquid crystal display.

10 Claims, No Drawings

LIQUID CRYSTAL COMPOSITION

TECHNICAL FIELD

The present invention relates to the technical field of liquid crystal display, particularly to a liquid crystal composition, and a liquid crystal display element or a liquid crystal display including the liquid crystal composition.

BACKGROUND OF THE PRESENT INVENTION

At represent, liquid crystal compounds, with the application field thereof being expanded more and more widely, may be applied to various types of display devices, optical devices, sensors and so on. There are various kinds of liquid crystal compounds applied to the field of display, wherein a nematic liquid crystal compound is applied the most widely. The nematic liquid crystal has been applied to passive TN and STN matrix displays and systems with TFT active matrix.

For the application field of TFT-LCD (Thin-Film Transistor Technology), in recent years, although the market has been very huge and the technology has been gradually matured, people also have constantly improving requirement to the display technology, especially to aspects of achieving fast response and reducing a driving voltage to reduce a power consumption. As one of the important optoelectronic materials of the liquid crystal display, a liquid crystal material plays an important role in improving the performance of the liquid crystal display.

As a liquid crystal material, it is required of good chemical and thermal stability, as well as stability to an electric field and electromagnetic radiation. Moreover, as a liquid crystal material for the TFT-LCD (Thin-Film Transistor Technology), it is not only required of the stabilities mentioned above, but also required of wide nematic phase temperature range, appropriate birefringence anisotropy, very high resistivity, good anti-ultraviolet performance, high charge retention rate, low vapor pressure and other performances.

For eliminating ghosting and trailing of a display screen in the dynamic picture display application, the liquid crystal is required of a very fast response speed, so, the liquid crystal is required of a lower rotary viscosity γ1. In addition, for portable devices, it is hope that the driving voltage of the liquid crystal is as low as possible, in order to reduce the energy consumption; and for displays used as TV and so on, the driving voltage of the liquid crystal is not required to be as low as that mentioned above.

The viscosity of the liquid crystal compounds, especially the rotary viscosity γ1, directly influences the response time of the liquid crystal after being powered up, and whether a rise time ($t_{on}$) or a fall time ($t_{off}$) is directly proportional to the rotary viscosity γ1 of the liquid crystal; due to being related to a liquid crystal cell and the driving voltage, the rise time ($t_{on}$) may be adjusted through a method for increasing the driving voltage and by reducing the thickness of the liquid crystal cell; and due to being unrelated to the driving voltage but related to elastic constant of the liquid crystal and the thickness of the liquid crystal cell, the fall time ($t_{off}$) is reduced by reducing the thickness of the cell. However, modes of motion of liquid crystal molecules are different under different display modes, the three modes such as TN, IPS and VA are inversely proportional to average elastic constant K, twist elastic constant and bend elastic constant respectively.

In accordance with a continuum theory of the liquid crystal, various liquid crystals will 'rebound' back to an original shape through an intermolecular interaction after being deformed under the action of an external force (an electric field and a magnetic field). Similarly, the liquid crystals also form 'viscosity' due to the intermolecular interaction. Small changes of the liquid crystal molecules will cause significant changes on the conventional parameter performance of the liquid crystal, some of these changes have a certain regularity, and some are less likely to find the regularity, which will have obvious influences on the intermolecular interaction, these influences are very delicate, and a perfect theoretical explanation has so far not formed yet.

The viscosity of the liquid crystal is related to the liquid crystal molecular structure, the study on the relationship between the viscosity and the liquid crystal molecular structure of a liquid crystal system formed by different liquid crystal molecules is one of the important tasks of liquid crystal formula engineers.

DESCRIPTION OF THE PRESENT INVENTION

An object of the present invention is to provide a liquid crystal composition, and a liquid crystal display element or a liquid crystal display including the liquid crystal composition. The liquid crystal composition has lower viscosity and may achieve fast response, while having moderate dielectric anisotropy Δε, moderate optical anisotropy Δn and high stability to heat and light. The liquid crystal display element or liquid crystal display has wider nematic phase temperature range, appropriate birefringence anisotropy, very high resistivity, good anti-ultraviolet performance, high charge retention rate, low vapor pressure and other performances.

In order to achieve the above beneficial technical effects, the present invention provides a liquid crystal composition, including one or more compounds shown as formula I and one or more compounds shown as formula II, and the liquid crystal composition including a compound shown as formula II-A:

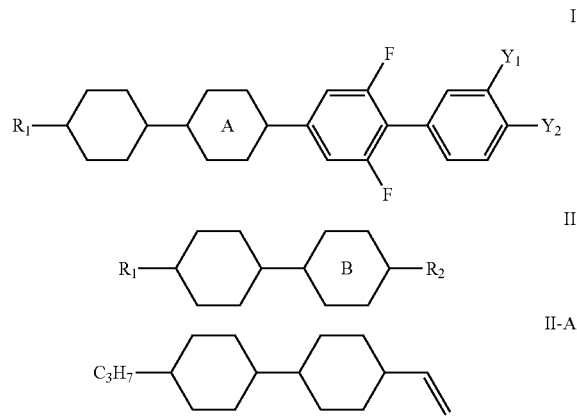

wherein $Y_1$ represents F or H, $Y_2$ represents F, $OCF_3$, $CF_3$ or $OCF_2H$, and $Y_1$ and $Y_2$ may not represent F at the same time;

$R_1$, $R_2$ and $R_3$ each independently represent C1-C9 alkyl, fluoro-substituted C1-C9 alkyl, C1-C9 alkoxy, fluoro-substituted C1-C9 alkoxy, C2-C9 alkenyl, fluoro-substituted C2-C9 alkenyl, C3-C8 alkenoxy or fluoro-substituted C3-C8 alkenoxy; and

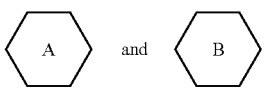

each independently represent 1,4-phenylene, 1,4-cyclohexylidene or 1,4-cyclohexenylene.

The liquid crystal composition provided by the present invention must include at least one compound shown as formula I, must include a compound shown as formula II-A in the compounds shown as formula II, and further includes other compounds in one or more compounds shown as formula II excepting formula II-A.

As a preferred solution, the liquid crystal composition provided by the present invention does not include a liquid crystal compound containing —CN, or does not include a liquid crystal compound containing a pyridine or pyrimidine ring.

The invention further does not include a liquid crystal compound with a fused ring structure preferably.

The liquid crystal composition provided by the present invention has Δn [589 nm, 25° C.] larger than 0.08, Δε [1 KHz, 25° C.] larger than 2, a clearing point Cp larger than 70.0° C., a rotary viscosity $\gamma_1$ [1 KHz, 25° C.] between 40 and 100 mPa·s.

The liquid crystal composition provided by the present invention, wherein the mass content of the compounds shown as formula I is preferably 1 to 20%; the content of the compounds shown as formula II-A is preferably 20 to 40%, and the content of the compounds shown as formula II is preferably 25 to 55%.

The liquid crystal composition of the present invention does not include a liquid crystal ingredient containing a —CN structure or a compound containing a pyridine and pyridine ring. The —CN has very large permanent dipole moment and relatively abundant electron cloud, and is easy to adsorb the cations, thus resulting in decrease of the electrical properties of the liquid crystal, such as charge retention rate VHR, resistivity ρ and power consumption. The quality of the compound containing pyridine and pyridine ring is decreased due to the electrons thereof are easily excited under UV.

Liquid crystal molecules with a fused ring structure often do not have a good linearity and a higher viscosity, resulted in being not conducive to improving the response speed of liquid crystal.

The compounds shown as formula I are preferably compounds shown as formulae I1 to I7:

I1
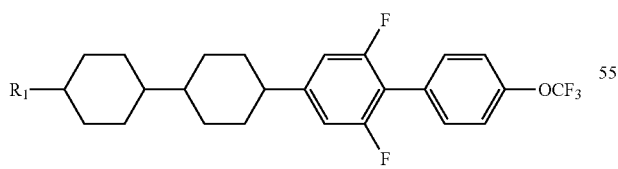

I2
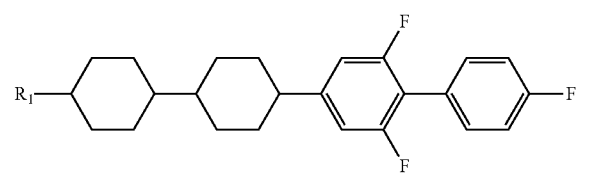

I3
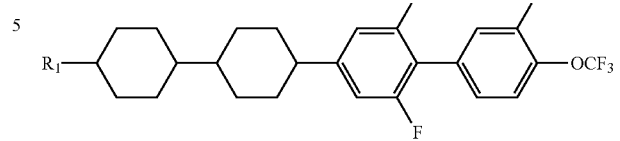

I4
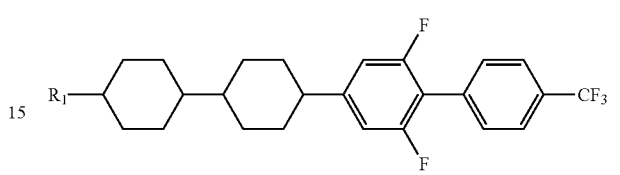

I5
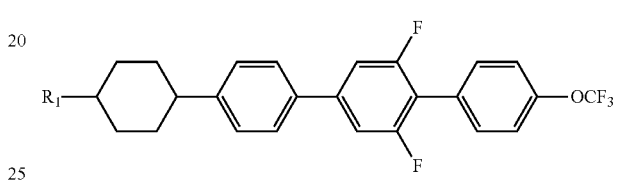

I6
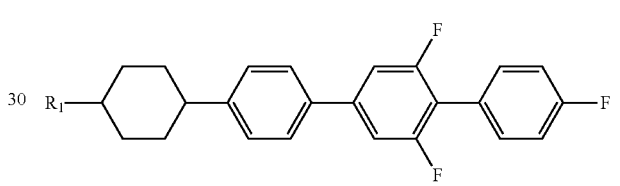

I7
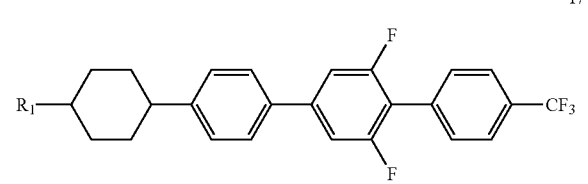

wherein $R_1$ each independently represents C1-C9 alkyl, fluoro-substituted C1-C9 alkyl, C1-C9 alkoxy, fluoro-substituted C1-C9 alkoxy, C2-C9 alkenyl, fluoro-substituted C2-C9 alkenyl, C3-C8 alkenoxy or fluoro-substituted C3-C8 alkenoxy; and one or more compounds shown as formula II include the compounds shown as formula II-A, and preferably one or more compounds in the compounds shown as formulae II1 to II10:

II1
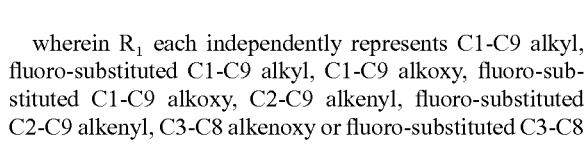

II2

II3
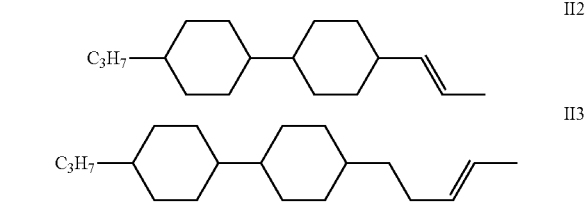

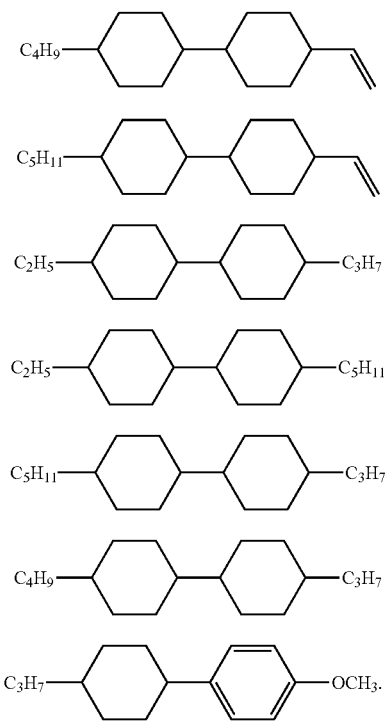

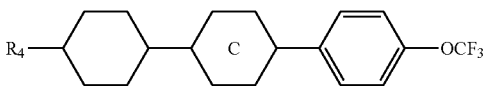

wherein R₄ each independently represents $C_1$-$C_9$ alkyl, fluoro-substituted $C_1$-$C_9$ alkyl, $C_1$-$C_9$ alkoxy, fluoro-substituted $C_1$-$C_9$ alkoxy, $C_2$-$C_9$ alkenyl, fluoro-substituted $C_2$-$C_9$ alkenyl, $C_3$-$C_8$ alkenoxy or fluoro-substituted $C_3$-$C_8$ alkenoxy; and

represents 1,4-phenylene, 1,4-cyclohexylidene or 1,4-cyclohexenylene.

The liquid crystal composition provided by the present invention, wherein the mass content of the compounds shown as formula III is preferably 5 to 20%.

The compounds shown as formula III specifically and preferably are:

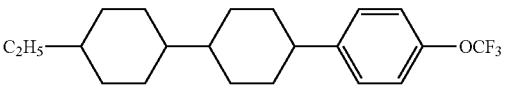
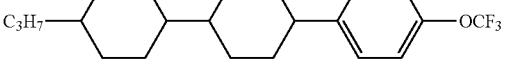
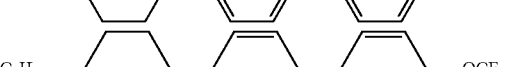
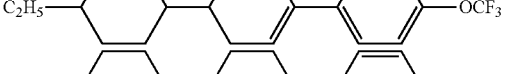
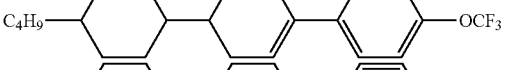

The compounds shown as formula I generally have not only a good mutual solubility with other liquid crystals, but also a higher clearing point (CP) which is generally higher than 200° C. and changed along with a length of an $R_1$ alkyl chain, when the alkyl chain is longer, the clearing point CP will be higher and will also be changed by changes of $Y_1$ and $Y_2$; many fluorine atoms often will lead to reduction of the CP, at the same time, the dielectric anisotropy $\Delta\varepsilon$ is increased, $OCF_3$ will rise CP by about 10° C. relative to F.

The compounds shown as formula I have greater dielectric anisotropy $\Delta\varepsilon$ between 9 and 20, because the substituents $OCF_3$ and $CF_3$ have a larger electronegativity and a cumulative effect formed with fluorine atoms, the compounds shown as formulae I3, I4, I7 and I8 have a relatively larger permanent dipole moment, the dielectric anisotropy $\Delta\varepsilon$ is relatively larger which reaches to 15 or more.

The compounds shown as formulae I5, I6, I7 and I8 have a terphenyl conjugated system, relative to a large terphenyl conjugated system of the compounds shown as formulae I1, I2, I3 and I4, the compounds shown as formulae I5, I6, I7 and I8 have a larger optical anisotropy $\Delta n$, and are respectively suitable for blending liquid crystal mixtures with a larger or smaller $\Delta n$.

The compounds shown as formula II have very low rotary viscosity $\gamma_1$, dielectric anisotropy $\Delta\varepsilon$ approximate to neutral, smaller optical anisotropy $\Delta n$, and advantages in improving the viscosity and the low temperature performance of the liquid crystal. Different alkyl substituents have influence on the rotary viscosity $\gamma_1$ and the clearing point CP of the liquid crystal; generally, a longer alkyl chain or alkenyl chain will increase the rotary viscosity $\gamma_1$ of the liquid crystal while improving the clearing point CP, but the $\gamma_1$ of the compounds shown as formula II-A is the lowest.

The liquid crystal composition provided by the present invention may also be added with one or more compounds shown as formula III:

the compounds shown as formula III have a moderate optical anisotropy $\Delta n$, a dielectric anisotropy $\Delta\varepsilon$ between 5 and 9, a lower viscosity $\gamma_1$ and a clearing point CP generally higher than 120° C., and may be configured to adjust parameters of the mixed liquid crystal, such as CP, $\Delta n$, $\Delta \varepsilon$ and $\gamma_1$. In the compounds shown as formula III, $R_1$ preferably represents a C1-C5 linear alkyl compound.

The liquid crystal composition provided by the present invention may also be added with one or more compounds shown as formula IV:

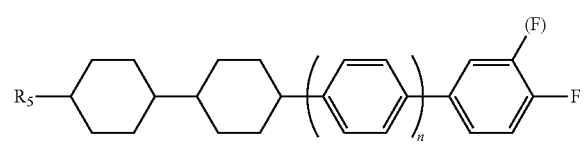

IV wherein $R_5$ each independently represents C1-C9 alkyl, fluoro-substituted C1-C9 alkyl, C1-C9 alkoxy, fluoro-substituted C1-C9 alkoxy, C2-C9 alkenyl, fluoro-substituted C2-C9 alkenyl, C3-C8 alkenoxy or fluoro-substituted C3-C8 alkenoxy;

n represents 0 and 1; and (F) represents H or F.

The liquid crystal composition provided by the present invention, wherein the mass content of the compounds shown as formula IV is preferably 5 to 20%.

In the compounds shown as formula IV, $R_1$ preferably represents a C1-C5 linear alkyl compound. The compounds shown as formula IV have a moderate $\Delta \varepsilon$, a higher CP and a lower viscosity, and are suitable for adjusting the viscosity, the CP and the $\Delta \varepsilon$ of the mixed liquid crystal.

The compounds shown as formula IV further and preferably are:

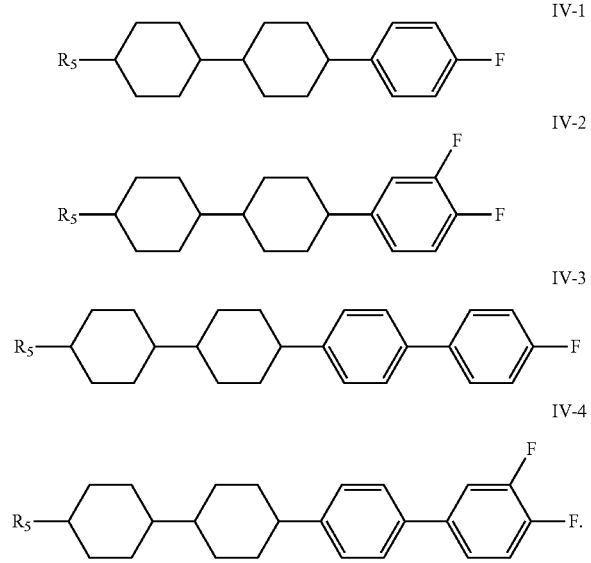

The liquid crystal composition provided by the present invention may also be added with one or more compounds shown as formula V:

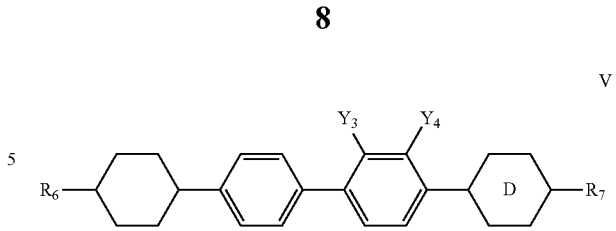

V wherein $R_6$ and $R_7$ each independently represent C1-C9 alkyl, fluoro-substituted C1-C9 alkyl, C1-C9 alkoxy, fluoro-substituted C1-C9 alkoxy, C2-C9 alkenyl, fluoro-substituted C2-C9 alkenyl, C3-C8 alkenoxy or fluoro-substituted C3-C8 alkenoxy;

$Y_3$ and $Y_4$ represent H or F, but may not represent F at the same time; and

represents 1,4-phenylene, 1,4-cyclohexylidene or 1,4-cyclohexenylene.

The liquid crystal composition provided by the present invention, wherein the mass content of the compounds shown as formula V is preferably 2 to 15%.

In the compounds shown as formula V, $R_6$ and $R_7$ preferably represent a C1-C5 linear alkyl compound. The compounds shown as formula V have a very higher CP which facilitates expanding service temperature range of the liquid crystal.

The compounds shown as formula V further and preferably are:

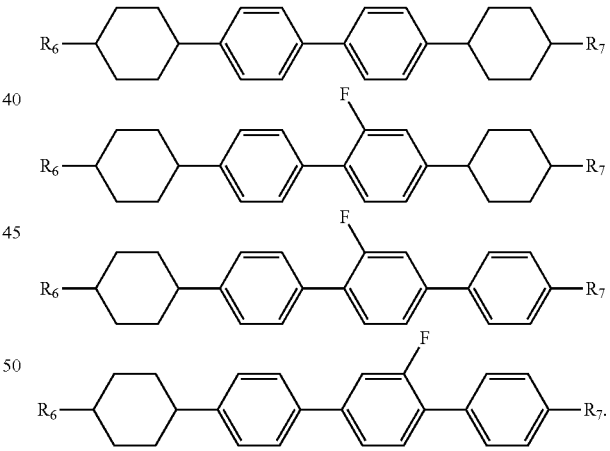

In the compounds shown as formula V, $R_6$ and $R_7$ are preferably C1-C5 linear alkyl.

The liquid crystal composition provided by the present invention may also be added with one or more compounds shown as formula VI:

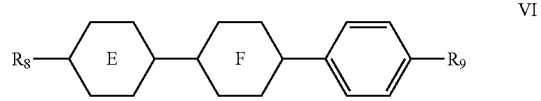

VI wherein $R_8$ represents C1-C9 alkyl, fluoro-substituted C1-C9 alkyl, C1-C9 alkoxy, fluoro-substituted C1-C9 alkoxy, C2-C9 alkenyl, fluoro-substituted C2-C9 alkenyl, C3-C8 alkenoxy or fluoro-substituted C3-C8 alkenoxy;

represents 1,4-phenylene, 1,4-cyclohexylidene or 1,4-cyclohexenylene;

represents 1,4-phenylene, fluoro 1,4-phenylene, 1,4-cyclohexylidene or 1,4-cyclohexenylene; and $R_9$ represents F, C1-C9 alkyl, fluoro-substituted C1-C9 alkyl, C1-C9 alkoxy, fluoro-substituted C1-C9 alkoxy, C2-C9 alkenyl, fluoro-substituted C2-C9 alkenyl, C3-C8 alkenoxy or fluoro-substituted C3-C8 alkenoxy.

The liquid crystal composition provided by the present invention, wherein the mass content of the compounds shown as formula VI is preferably 5 to 30%.

The compounds shown as formula VI further and preferably are:

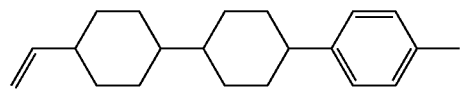
VI-1

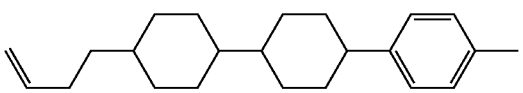
VI-2

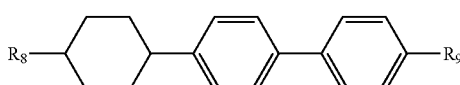
VI-3

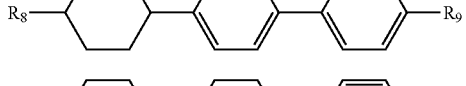
VI-4

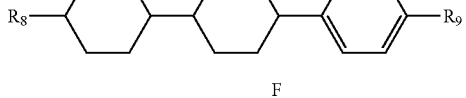
VI-5

The compounds shown as formulae VI-1 and VI-2 have a dielectric anisotropy Δε approximate to neutral, a lower viscosity $γ_1$, a higher clearing point, a larger K value, and may be configured to adjust the K value and the $γ_1$ of the liquid crystal, thus achieving fast response. Terphenyl compounds shown as formula VI-5 have a large optical anisotropy Δn due to having a larger conjugated system, and are especially suitable for blending a liquid crystal mixture of a high refractive index.

The liquid crystal composition provided by the present invention may also be added with one or more compounds shown as formula VII:

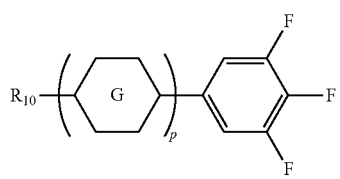
VII wherein $R_{10}$ represents C1-C9 alkyl, fluoro-substituted C1-C9 alkyl, C1-C9 alkoxy, fluoro-substituted C1-C9 alkoxy, C2-C9 alkenyl, fluoro-substituted C2-C9 alkenyl, C3-C8 alkenoxy or fluoro-substituted C3-C8 alkenoxy;

represents one or more of 1,4-phenylene, fluoro 1,4-phenylene, 1,4-cyclohexylidene, 1,4-cyclohexenylene and/or one or two disconnected groups in the 1,4-cyclohexylidene formed by substituting $CH_2$ by O; and represents 2 or 3.

The liquid crystal composition provided by the present invention, wherein the mass content of the compounds shown as formula VII is preferably 5 to 55%.

The compounds shown as formula VII further and preferably are:

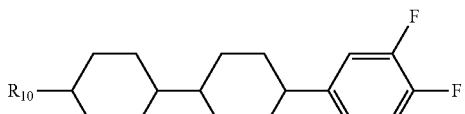

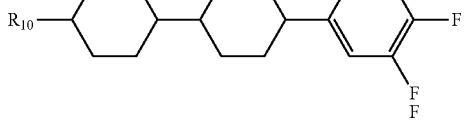

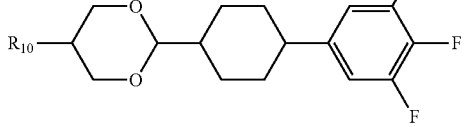

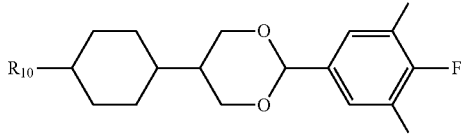

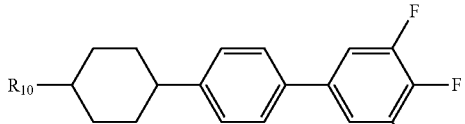

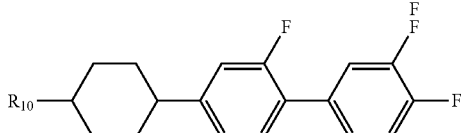

-continued

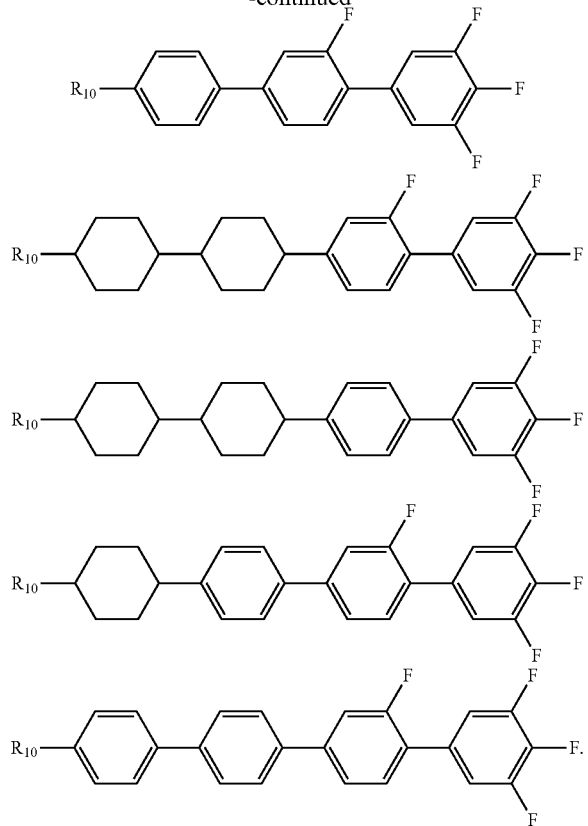

The compounds shown as formula VII have a larger dielectric anisotropy Δε and a low rotary viscosity $\gamma_1$, and may be configured to blend a liquid crystal mixture for reducing the driving voltage of the liquid crystal and increasing the response speed of display devices.

The liquid crystal composition provided by the present invention may also include one or more compounds containing naphthenic base shown as formulae VIII-1, VIII-2 and/or formula VIII-3 on the basis of including or not including compounds shown as formula VIII, formula VI, formula V, formula VI and formula VII VIII-1
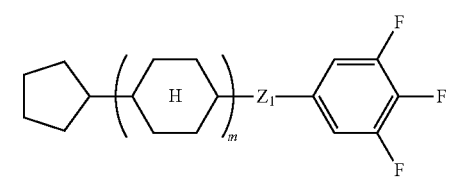

VIII-2
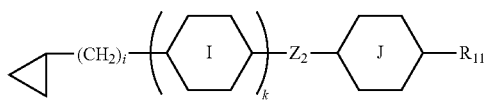

VIII-3
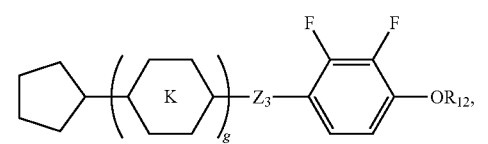

wherein

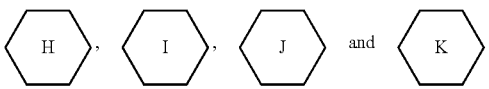

each independently represent one or more of 1,4-cyclohexylidene, one or two disconnected groups in the 1,4-cyclohexylidene formed by substituting $CH_2$ by O, 1,4-phenylene and/or fluoro 1,4-phenylene;

$Z_1$, $Z_2$ and $Z_3$ each independently represent single bond, —$CF_2O$— or —$CH_2O$—;

m, k and g each independently represent 1, 2 or 3;

i represents 0, 1 and 2;

$R_{11}$ represents F, C1-C9 alkyl, fluoro-substituted C1-C9 alkyl, C1-C9 alkoxy, fluoro-substituted C1-C9 alkoxy, C2-C9 alkenyl, fluoro-substituted C2-C9 alkenyl, C3-C8 alkenoxy or fluoro-substituted C3-C8 alkenoxy; and $R_{12}$ represents C1-C5 alkyl, fluoro-substituted C1-C5 alkyl, C1-C5 alkoxy, fluoro-substituted C1-C5 alkoxy, C2-C5 alkenyl, fluoro-substituted C2-C5 alkenyl, C3-C5 alkenoxy or fluoro-substituted C3-C5 alkenoxy.

The compounds shown as formula VIII do not include a soft terminal group alkyl chain, so they have a stronger rigidity, the changes of intermolecular interaction of the liquid crystal show a larger K value and a higher CP.

The compounds shown as formula VIII-1 preferably are:

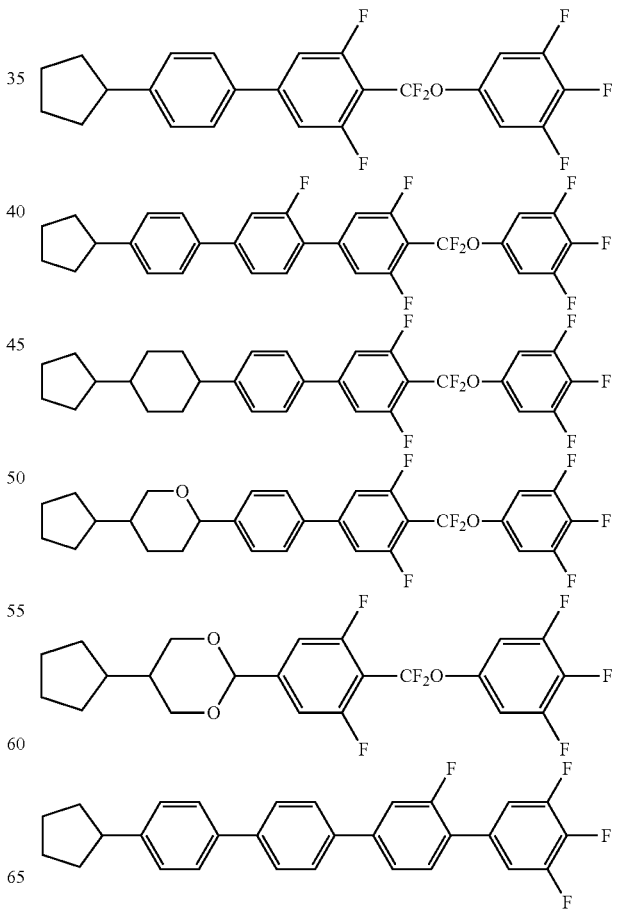

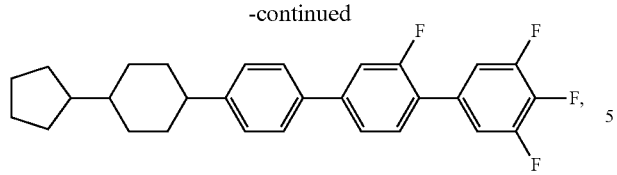

the compounds shown as formula VIII-2 preferably are:

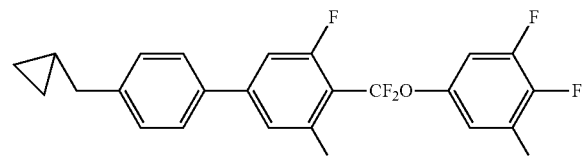
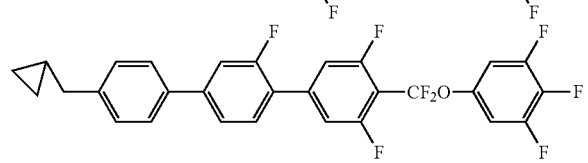
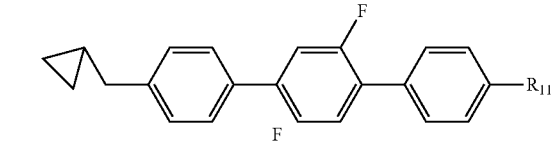
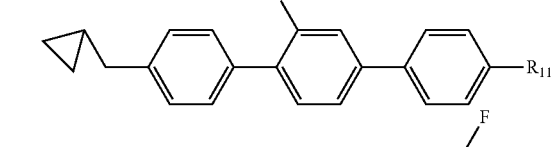
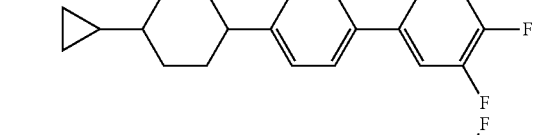
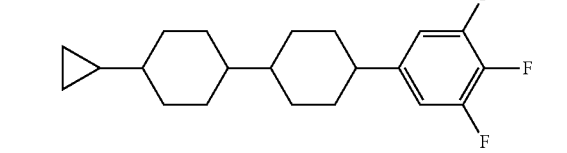
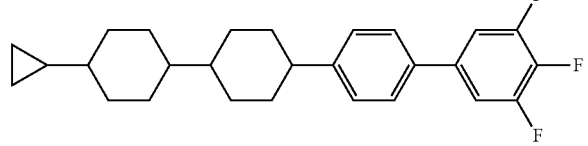
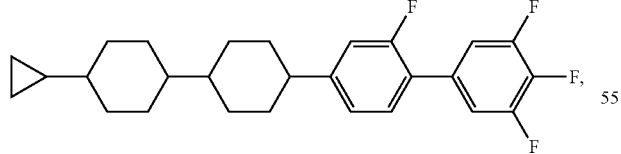

the compounds shown as formula VIII-3 preferably are:

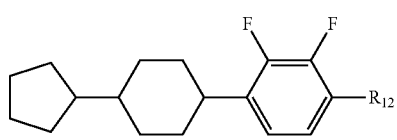

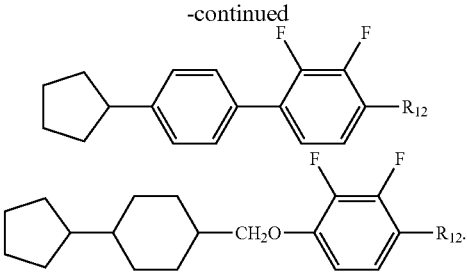

Liquid crystal composition of different proportions of ingredients will show slightly different performances, for example, the dielectric anisotropy Δε, the optical anisotropy Δn, the nematic phase of the liquid crystal being converted to a liquid transition temperature point CP of liquid, and stability under low temperature all will be different, and may be applied to different types of display devices, but the same characteristic is that the rotary viscosity $\gamma_1$ is relatively low. It is applied to liquid crystal displays and may achieve fast response.

The liquid crystal compounds provided by the present invention may also be added with doping agents of various functions, and the content of the doping agents is preferably 0.01 to 1%, and the doping agents are mainly antioxidants, ultraviolet absorbents and chiral agents.

The antioxidants and the ultraviolet absorbents preferably are:

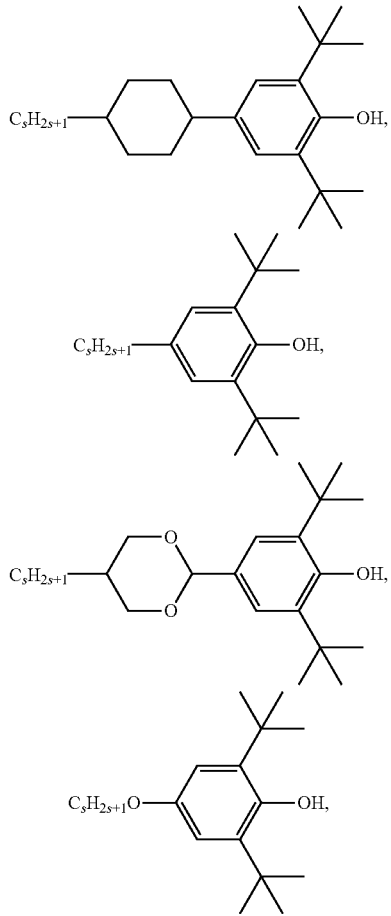

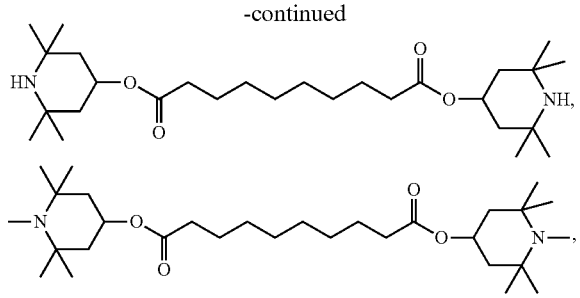

S represents an integer from 1 to 10.

The (levorotatory or dextrorotatory) chiral agents preferably are

The present invention further relates to a liquid crystal display element or a liquid crystal display including any one of the liquid crystal compositions; the display element or display is an active matrix display element or display or a passive matrix display element or display.

The liquid crystal display element or liquid crystal display preferably is an active matrix addressing liquid crystal display element or liquid crystal display.

The active matrix display element or display is specifically a TN-TFT or IPS-TFT liquid crystal display element or display.

The liquid crystal composition provided by the present invention has lower viscosity and may achieve fast response, while having moderate dielectric anisotropy $\Delta\varepsilon$, moderate optical anisotropy $\Delta n$ and high stability to heat and light.

A liquid crystal material including the liquid crystal composition provided by the present invention not only has good chemical and thermal stability, as well as stability to the electric field and electromagnetic radiation. But also, as a liquid crystal material for a TFT-LCD (Thin-Film Transistor Technology), it further has wide nematic phase temperature range, appropriate birefringence anisotropy, very high resistivity, good anti-ultraviolet performance, high charge retention rate, low vapor pressure and other performances.

DETAILED DESCRIPTION OF THE PRESENT INVENTION

The present invention is further illustrated as below with reference to embodiments, but the present invention is not limited thereto. If without a special request, the methods are all conventional methods. If without a special request, all the raw materials may be obtained from the public commercial ways. If without a special request, the percents are all mass percents.

In the following embodiments,

CP represents a clearing point, which is determined by directly using a WRX-1S microscopic thermal analyzer, and a heating rate is set as 3° C./min.

$\Delta n$ represents an optical anisotropy (589 nm, 20° C.), $\Delta\varepsilon$ represents an dielectric anisotropy (25° C., 1 KHz, HP4284A, TN levorotatory cell of 5.2 microns), $\gamma_1$ represents a rotary viscosity (mpas) at 20° C., VHR (%) represents a charge retention rate (5 V, 60 Hz, 20° C.) and $\rho$ ($\times 10^{13}$ $\Omega$·cm) represents a resistivity (20° C.), and testers for the charge retention rate VHR (%) and the resistivity p ($\times 10^{13}$ $\Omega$·cm) are all TOYO06254 and TOYO6517 liquid crystal physical property evaluation systems (test temperature of 20° C., time of 16 ms, test box of 7.0 microns).

| Embodiment 1 | |
|---|---|
| Monomer | Content (%) |
| C$_3$H$_7$—⬡—⬡—CH=CH$_2$ | 23 |
| C$_2$H$_5$—⬡—⬡—⬢—OCF$_3$ | 8 |

Embodiment 1

| Monomer | Content (%) |
|---|---|
| C$_3$H$_7$—⬡—⬡—⌬—OCF$_3$ | 10 |
| CH$_2$=CH—⬡—⬡—⌬—CH$_3$ | 15 |
| C$_2$H$_5$—⬡—⬡—⌬—⌬(3,4-F$_2$) | 6 |
| cyclopentyl—⌬—⌬(3,5-F$_2$)—CF$_2$O—⌬(3,4,5-F$_3$) | 15 |
| cyclopentyl—⌬—⌬(2-F)—⌬(3,5-F$_2$)—CF$_2$O—⌬(3,4,5-F$_3$) | 8 |
| C$_2$H$_5$—⬡—⬡—⌬(2,6-F$_2$)—⌬—OCF$_3$ | 15 |

Δε [1 KHz, 20° C.]: 9.5
Δn [589 nm, 20° C.]: 0.115
Cp: 118° C.
γ$_1$: 160 mPa·s.

Embodiment 2

| Monomer | Content (%) |
|---|---|
| C$_3$H$_7$—⬡—⬡—CH=CH$_2$ | 30 |
| C$_2$H$_5$—⬡—⬡—C$_3$H$_7$ | 9 |
| C$_4$H$_9$—⬡—⬡—⌬(3,4-F$_2$) | 15 |

-continued
| Embodiment 2 | |
|---|---|
| Monomer | Content (%) |
| 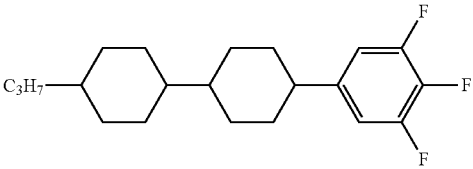 | 12 |
| 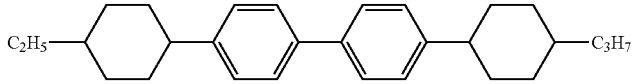 | 6 |
| 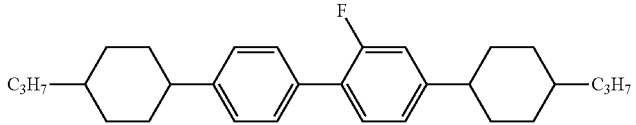 | 6 |
| 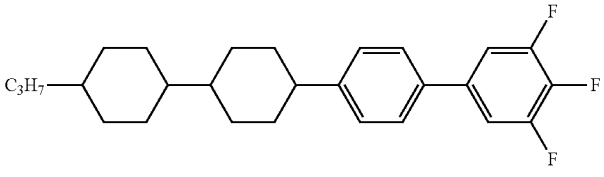 | 6 |
| 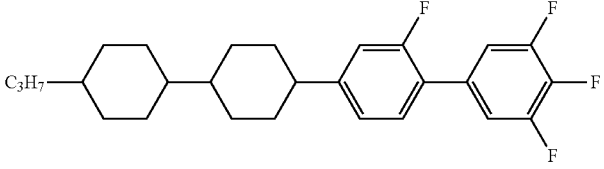 | 7 |
| 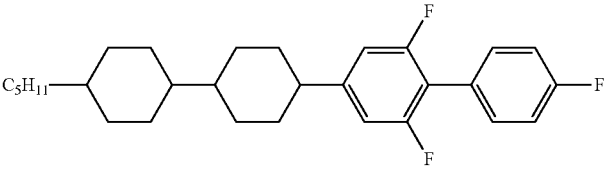 | 9 |
Δε [1 KHz, 20° C.]: 4.4
Δn [589 nm, 20° C.]: 0.095
Cp: 130° C.
γ₁: 177 mPa · s.
| Embodiment 3 | |
|---|---|
| Monomer | Content (%) |
| 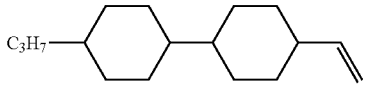 | 32 |
| 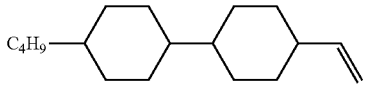 | 8 |
|  | 9 |

-continued
| Embodiment 3 | |
|---|---|
| Monomer | Content (%) |
|  | 8 |
| 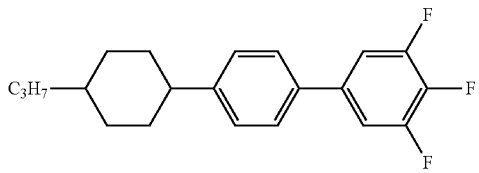 | 6 |
| 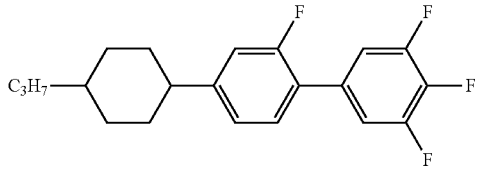 | 12 |
| 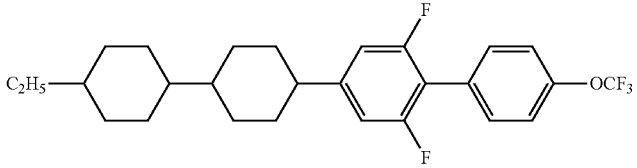 [SMILES: CCC1CCC(C2CCC(c3cc(F)c(-c4ccc(OC(F)(F)F)cc4)c(F)c3)CC2)CC1] | 6 |
| 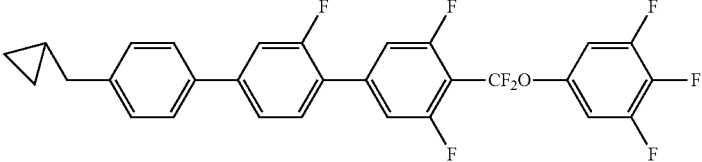 | 19 |
Δε [1 KHz, 20° C.]: 10.1
Δn [589 nm, 20° C.]: 0.110
Cp: 79° C.
γ$_1$: 76 mPa · s.
| Embodiment 4 | |
|---|---|
| Monomer | Content (%) |
| 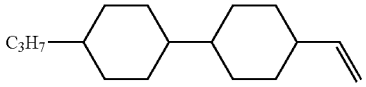 | 20 |
| 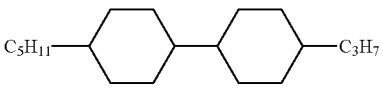 | 15 |
| 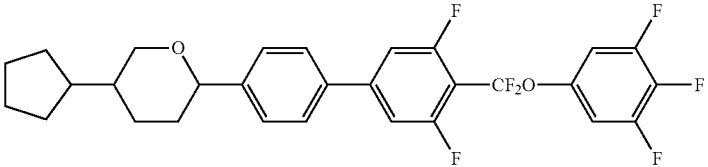 | 10 |

| Embodiment 4 | |
|---|---|
| Monomer | Content (%) |
| 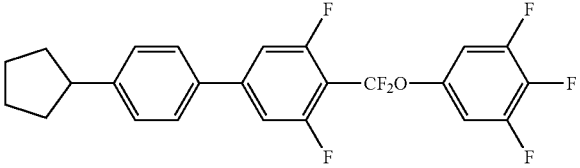 | 18 |
| 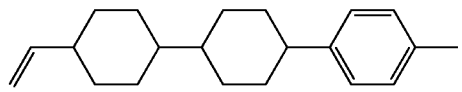 [SMILES: C=CC1CCC(C2CCC(c3ccc(C)cc3)CC2)CC1] | 9 |
| 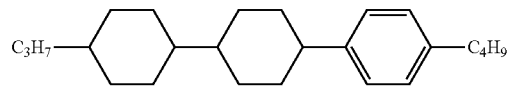 | 8 |
| 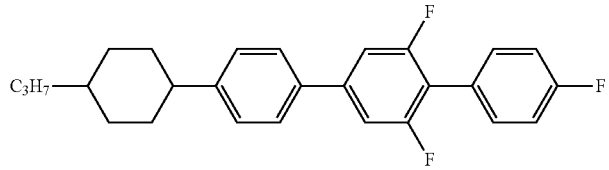 | 10 |
| 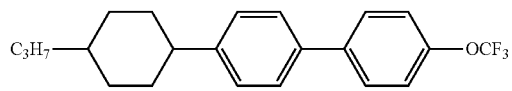 | 10 |
Δε [1 KHz, 20° C.]: 9
Δn [589 nm, 20° C.]: 0.105
Cp: 100° C.
γ₁: 99 mPa · s.
| Embodiment 5 | |
|---|---|
| Monomer | Content (%) |
| 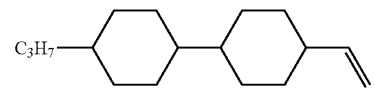 | 20 |
| 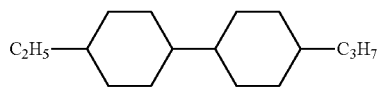 | 10 |
| 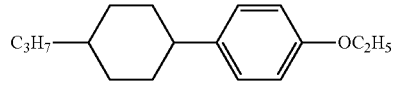 | 5 |
| 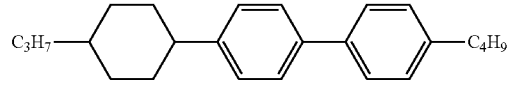 | 12 |
| 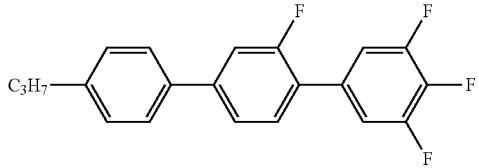 | 13 |

-continued

| Embodiment 5 | |
|---|---|
| Monomer | Content (%) |
| (cyclopropylmethyl)-C6H3-C6H3(F)-C6H2(F,F)-CF2O-C6H2(F,F,F) | 17 |
| C2H5-C6H4-C6H3(F)-C6H4-CH2CH2CH=CH2 | 13 |
| C2H5-C6H10-C6H4-C6H2(F,F)-C6H4-OCF3 | 10 |

Δε [1 KHz, 20° C.]: 9.0
Δn [589 nm, 20° C.]: 0.155
Cp: 104° C.
$\gamma_1$: 109 mPa · s.

| Embodiment 6 | |
|---|---|
| Monomer | Content (%) |
| C3H7-C6H10-C6H10-CH=CH2 | 32 |
| C4H9-C6H10-C6H10-CH=CH2 | 8 |
| C2H5-C6H10-C6H10-C6H4-OCF3 | 7 |
| C3H7-C6H10-C6H4-C6H4-OCF3 | 8 |
| CH2=CH-C6H10-C6H10-C6H4-CH3 | 10 |
| C3H7-C6H10-C6H10-C6H4-C4H9 | 8 |
| (cyclopropylmethyl)-C6H3-C6H3(F)-C6H2(F,F)-CF2O-C6H2(F,F,F) | 15 |

Embodiment 6
| Monomer | Content (%) |
|---|---|
| 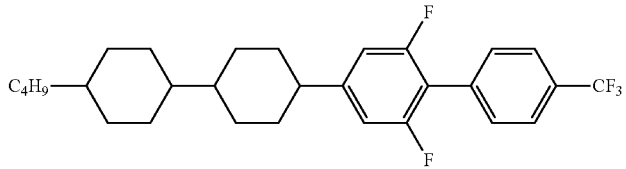 | 6 |
| 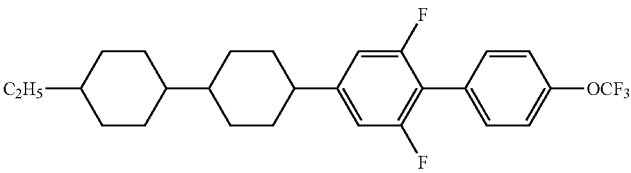 [SMILES: CCC1CCC(C2CCC(c3cc(F)c(-c4ccc(OC(F)(F)F)cc4)c(F)c3)CC2)CC1] | 6 |
Δε [1 KHz, 20° C.]: 5.6
Δn [589 nm, 20° C.]: 0.107
Cp: 112° C.
$\gamma_1$: 121 mPa · s.
Embodiment 7
| Monomer | Content (%) |
|---|---|
| 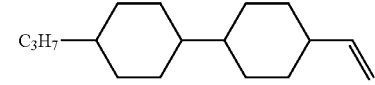 | 20 |
| 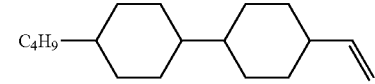 | 5 |
| 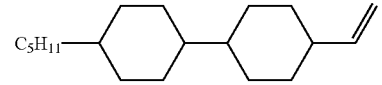 | 5 |
| 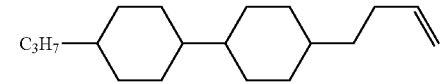 | 5 |
| 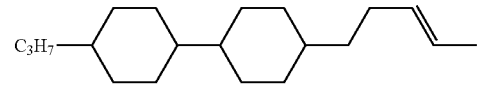 | 6 |
| 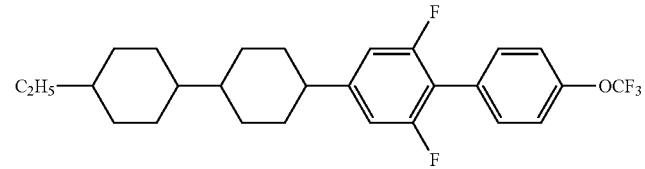 [SMILES: CCC1CCC(C2CCC(c3cc(F)c(-c4ccc(OC(F)(F)F)cc4)c(F)c3)CC2)CC1] | 11 |
| 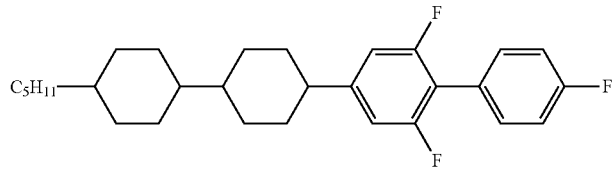 | 12 |

-continued

Embodiment 7

| Monomer | Content (%) |
|---|---|
| 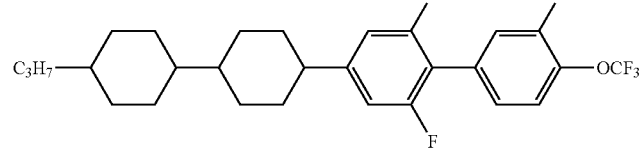 | 10 |
| 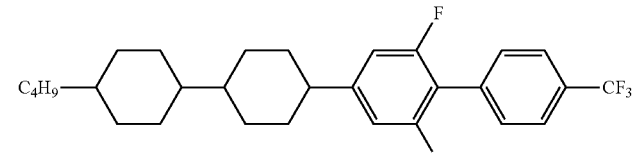 | 10 |
| 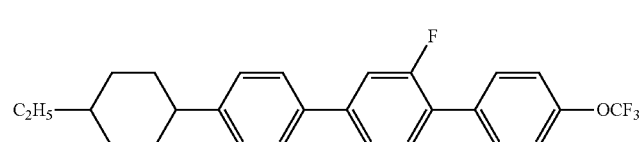 | 10 |
| 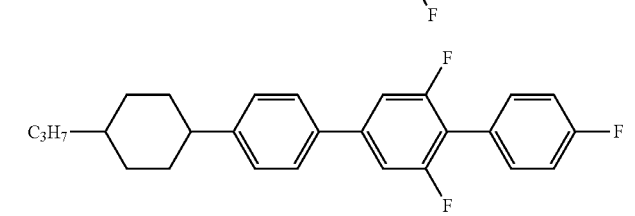 | 6 |

Δε [1 KHz, 20° C.]: 5.3
Δn [589 nm, 20° C.]: 0.114
Cp: 150° C.
γ₁: 300 mPa · s.

it is observed from the above embodiments that the liquid crystal composition of the present invention has a lower rotary viscosity γ₁, is applied to liquid crystal display, and may achieve fast response. Especially, it is suitable for liquid crystal materials for TN and IPS modes.

The invention claimed is:

1. A liquid crystal composition, comprising one or more compounds shown as formula I and one or more compounds shown as formula II, and the liquid crystal composition comprising a compound shown as formula II-A:

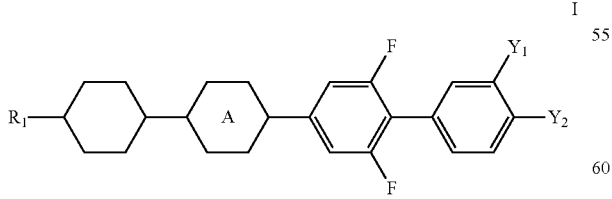

I

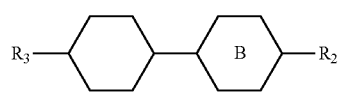

II

-continued

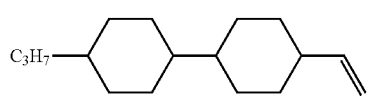

II-A wherein $Y_1$ represents F or H, $Y_2$ represents F, $OCF_3$, $CF_3$ or $OCF_2H$, and $Y_1$ and $Y_2$ can not represent F at the same time;

$R_1$, $R_2$ and $R_3$ each independently represent C1-C9 alkyl, fluoro-substituted C1-C9 alkyl, C1-C9 alkoxy, fluoro-substituted C1-C9 alkoxy, C2-C9 alkenyl, fluoro-substituted C2-C9 alkenyl, C3-C8 alkenoxy or fluoro-substituted C3-C8 alkenoxy; and

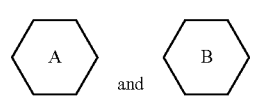

each independently represent 1,4-phenylene, 1,4-cyclohexylidene or 1,4-cyclohexenylene.

2. The liquid crystal composition according to claim 1, wherein one or more compounds shown as formula I are one or more of compounds shown as formulae I1 to I7:

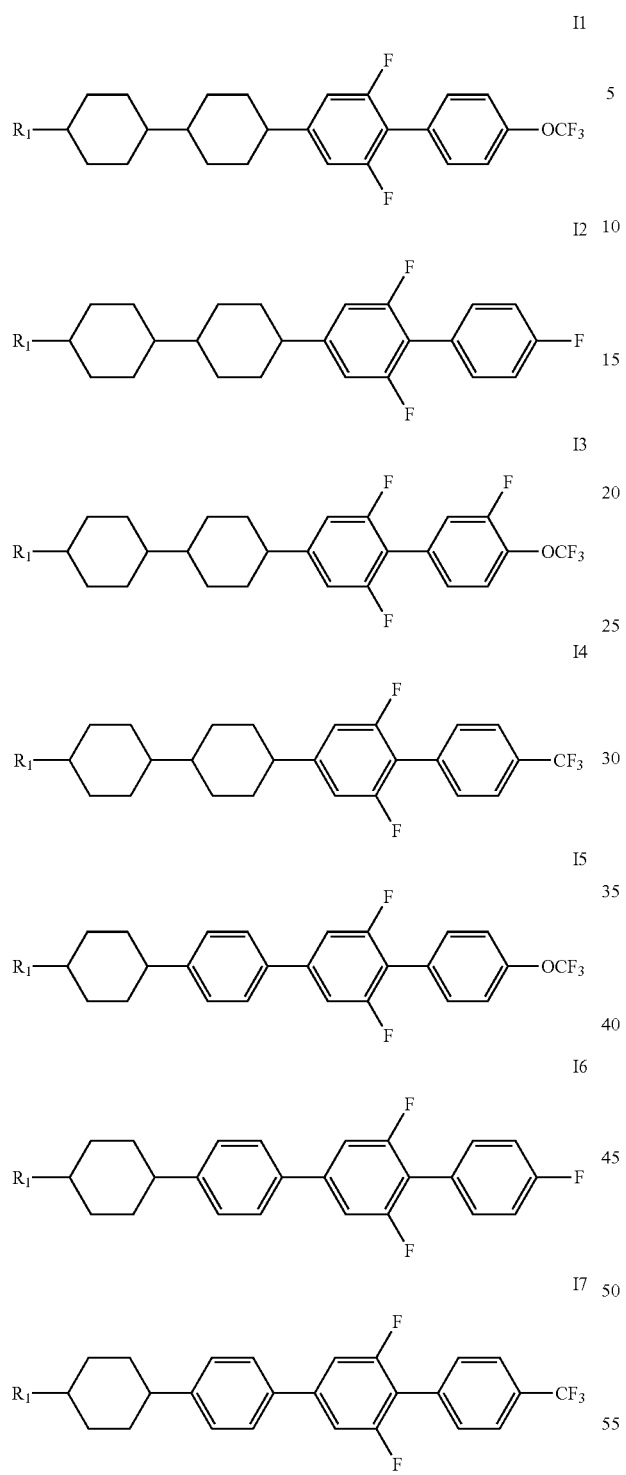

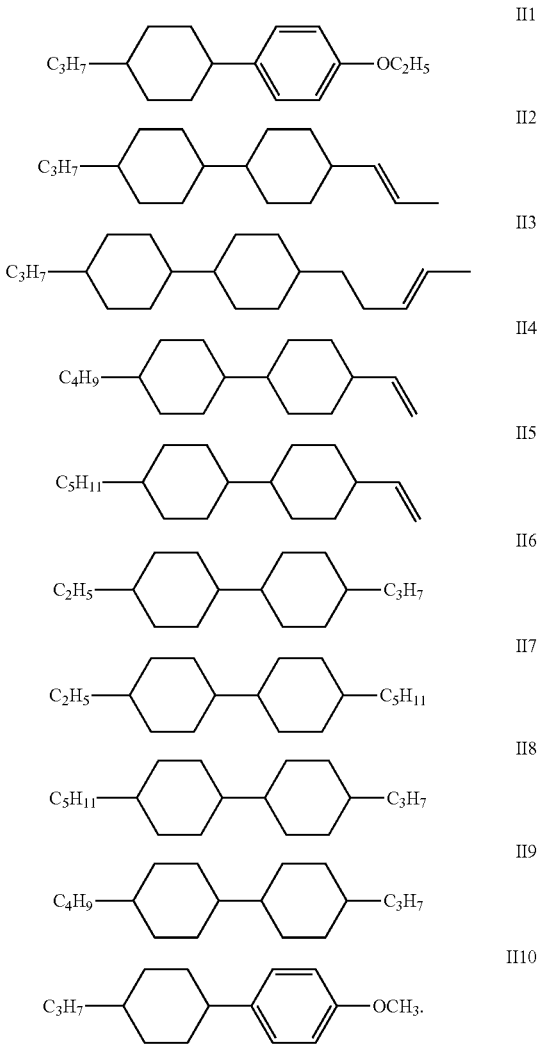

wherein $R_1$ each independently represents C1-C9 alkyl, fluoro-substituted C1-C9 alkyl, C1-C9 alkoxy, fluoro-substituted C1-C9 alkoxy, C2-C9 alkenyl, fluoro-substituted C2-C9 alkenyl, C3-C8 alkenoxy or fluoro-substituted C3-C8 alkenoxy; and one or more compounds shown as formula II comprise one or more of compounds shown as formulae II1 to II10:

3. The liquid crystal composition according to claim 1, further comprising one or more compounds shown as formula III:

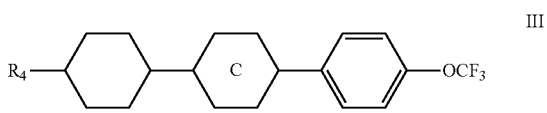

wherein $R_4$ each independently represents C1-C9 alkyl, fluoro-substituted C1-C9 alkyl, C1-C9 alkoxy, fluoro-substituted C1-C9 alkoxy, C2-C9 alkenyl, fluoro-substituted C2-C9 alkenyl, C3-C8 alkenoxy or fluoro-substituted C3-C8 alkenoxy; and

represents 1,4-phenylene, 1,4-cyclohexylidene or 1,4-cyclohexenylene.

4. The liquid crystal composition according to claim 1, further comprising one or more compounds shown as formula IV:

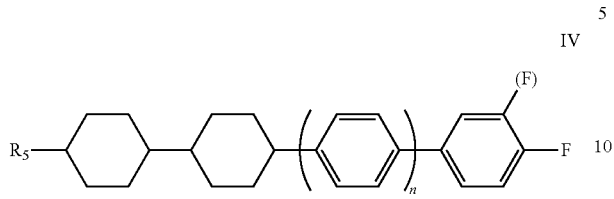

IV wherein $R_5$ each independently represents C1-C9 alkyl, fluoro-substituted C1-C9 alkyl, C1-C9 alkoxy, fluoro-substituted C1-C9 alkoxy, C2-C9 alkenyl, fluoro-substituted C2-C9 alkenyl, C3-C8 alkenoxy or fluoro-substituted C3-C8 alkenoxy;

n represents 0 and 1; and (F) represents H or F.

5. The liquid crystal composition according to claim 1, further comprising one or more compounds shown as formula V:

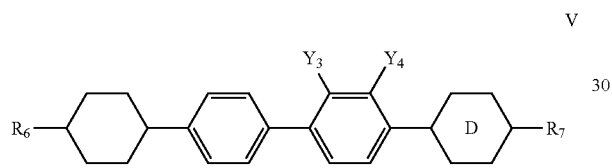

V wherein $R_6$ and $R_7$ each independently represent C1-C9 alkyl, fluoro-substituted C1-C9 alkyl, C1-C9 alkoxy, fluoro-substituted C1-C9 alkoxy, C2-C9 alkenyl, fluoro-substituted C2-C9 alkenyl, C3-C8 alkenoxy or fluoro-substituted C3-C8 alkenoxy;

$Y_3$ and $Y_4$ represent H or F, but can not represent F at the same time; and

represents 1,4-phenylene, 1,4-cyclohexylidene or 1,4-cyclohexenylene.

6. The liquid crystal composition according to claim 1, further comprising one or more compounds shown as formula VI:

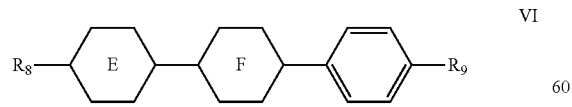

VI wherein $R_8$ represents C1-C9 alkyl, fluoro-substituted C1-C9 alkyl, C1-C9 alkoxy, fluoro- substituted C1-C9 alkoxy, C2-C9 alkenyl, fluoro-substituted C2-C9 alkenyl, C3-C8 alkenoxy or fluoro-substituted C3-C8 alkenoxy;

represents 1,4-phenylene, 1,4-cyclohexylidene or 1,4-cyclohexenylene;

represents 1,4-phenylene, fluoro 1,4-phenylene, 1,4-cyclohexylidene or 1,4-cyclohexenylene; and $R_9$ represents F, C1-C9 alkyl, fluoro-substituted C1-C9 alkyl, C1-C9 alkoxy, fluoro-substituted C1-C9 alkoxy, C2-C9 alkenyl, fluoro-substituted C2-C9 alkenyl, C3-C8 alkenoxy or fluoro-substituted C3-C8 alkenoxy.

7. The liquid crystal composition according to claim 1, further comprising one or more compounds shown as formula VII:

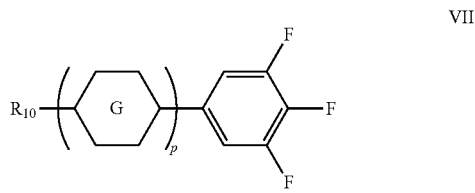

VII wherein $R_{10}$ represents C1-C9 alkyl, fluoro-substituted C 1-C9 alkyl, C1-C9 alkoxy, fluoro-substituted C1-C9 alkoxy, C2-C9 alkenyl, fluoro-substituted C2-C9 alkenyl, C3-C8 alkenoxy or fluoro-substituted C3-C8 alkenoxy;

represents one or more of 1,4-phenylene, fluoro 1,4-phenylene, 1,4-cyclohexylidene, 1,4-cyclohexenylene and/or one or two disconnected groups in the 1,4-cyclohexylidene formed by substituting $CH_2$ by O; and p represents 2 or 3.

8. The liquid crystal composition according to claim 1, further comprising one or more compounds shown as formula VIII-1, one or more compounds shown as formula VIII-2 and/or one or more compounds shown as formula VIII-3:

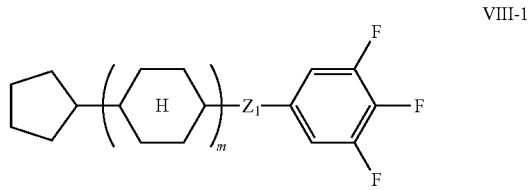

VIII-1

-continued

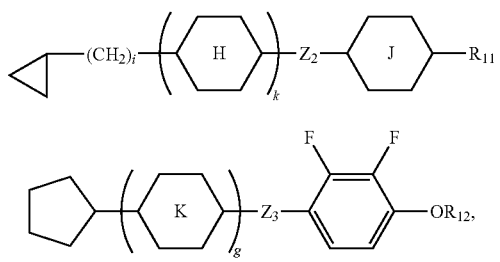

wherein

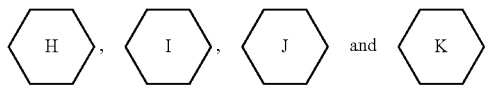

each independently represent one or more of 1,4-cyclohexylidene, one or two disconnected groups in the 1,4-cyclohexylidene formed by substituting $CH_2$ by O, 1,4-phenylene and/or fluoro 1,4-phenylene;

$Z_1$, $Z_2$ and $Z_3$ each independently represent single bond, $-CF_2O-$ or $-CH_2O-$;

m, k and g each independently represent 1, 2 or 3;

i represents 0, 1 and 2;

$R_{11}$ represents F, C 1-C9 alkyl, fluoro-substituted C 1-C9 alkyl, C 1-C9 alkoxy, fluoro-substituted C1-C9 alkoxy, C2-C9 alkenyl, fluoro-substituted C2-C9 alkenyl, C3-C8 alkenoxy or fluoro-substituted C3-C8 alkenoxy; and $R_{12}$ represents C1-05 alkyl, fluoro-substituted C1-05 alkyl, C1-05 alkoxy, fluoro-substituted C1-05 alkoxy, C2-05 alkenyl, fluoro-substituted C2-05 alkenyl, C3-05 alkenoxy or fluoro-substituted C3-05 alkenoxy.

9. A liquid crystal display element or a liquid crystal display, wherein the liquid crystal display element or the liquid crystal display comprises the liquid crystal composition according to claim 1; the display element or display is an active matrix display element or display or a passive matrix display element or display.

10. The liquid crystal display element or liquid crystal display according to claim 9, wherein the active matrix display element or display is a TN-TFT or IPS-TFT liquid crystal display element or display.

* * * * *